United States Patent
Hamada et al.

(10) Patent No.: US 10,154,155 B2
(45) Date of Patent: Dec. 11, 2018

(54) IMAGE READING APPARATUS CAPABLE OF DETERMINING OPENING-CLOSING STATE OF ORIGINAL CONVEYANCE DEVICE AND IMAGE FORMING APPARATUS EQUIPPED WITH IMAGE READING APPARATUS

(71) Applicant: CANON KABUSHIKI KAISHA, Tokyo (JP)

(72) Inventors: Kaoru Hamada, Nagareyama (JP); Satoshi Seki, Abiko (JP); Yohei Katto, Nagareyama (JP); Akiko Kanno, Kashiwa (JP); Hidenori Sunada, Abiko (JP); Asahiro Nakayoshi, Matsudo (JP); Seiji Shibaki, Abiko (JP); Masato Furukawa, Nagareyama (JP); Yumeng Zhang, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/258,261

(22) Filed: Sep. 7, 2016

(65) Prior Publication Data

US 2017/0070619 A1    Mar. 9, 2017

(30) Foreign Application Priority Data

Sep. 9, 2015    (JP) .................................. 2015-177543

(51) Int. Cl.
*H04N 1/00* (2006.01)
*H04N 1/04* (2006.01)
(Continued)

(52) U.S. Cl.
CPC ..... *H04N 1/00076* (2013.01); *H04N 1/00013* (2013.01); *H04N 1/00037* (2013.01);
(Continued)

(58) Field of Classification Search
CPC .................................................. H04N 1/00076
(Continued)

(56) References Cited

U.S. PATENT DOCUMENTS

| 9,332,146 B2 * | 5/2016 | Tao ..................... H04N 1/00771 |
| 9,444,966 B2 * | 9/2016 | Fukawa ................. H04N 1/125 |

(Continued)

FOREIGN PATENT DOCUMENTS

| JP | 2006025284 A | 1/2006 |
| JP | 2010278563 A | 12/2010 |
| JP | 2014011766 A | 1/2014 |

*Primary Examiner* — Jacky X Zheng
(74) *Attorney, Agent, or Firm* — Rossi, Kimms & McDowell LLP

(57) ABSTRACT

An image reading apparatus includes a first unit, a second unit that is pivotable against the first unit, and a controller. The first unit includes a platen, a member, and a movable first reader. The second unit includes an original tray, a conveyance unit that conveys an original from the original tray, a static second reader. The controller determines an opening/closing state of the second unit against the first unit based on read data obtained when the second reader reads the member. The first reader reads the first side of an original conveyed by the conveyance unit and the second reader reads the second side of the original when the original placed on the original tray is read. The first reader reads the first side while moving under the original when the original placed on the platen is read.

12 Claims, 13 Drawing Sheets

(51) Int. Cl.
*H04N 1/203* (2006.01)
*H04N 1/12* (2006.01)
*H04N 1/10* (2006.01)

(52) U.S. Cl.
CPC ....... *H04N 1/0057* (2013.01); *H04N 1/00058* (2013.01); *H04N 1/00063* (2013.01); *H04N 1/00827* (2013.01); *H04N 1/0464* (2013.01); *H04N 1/1061* (2013.01); *H04N 1/12* (2013.01); *H04N 1/2032* (2013.01); *H04N 2201/0091* (2013.01)

(58) Field of Classification Search
USPC ...................................... 358/1.14
See application file for complete search history.

(56) References Cited

U.S. PATENT DOCUMENTS

| | | | |
|---|---|---|---|
| 2003/0038229 A1* | 2/2003 | Fukatsu | H04N 1/00551 250/208.1 |
| 2011/0194161 A1* | 8/2011 | Nakamura | H04N 1/56 358/505 |
| 2012/0013957 A1* | 1/2012 | Honda | H04N 1/00551 358/498 |
| 2016/0057294 A1* | 2/2016 | Kobayashi | H04N 1/0074 358/449 |

\* cited by examiner

FAR SIDE → NEAR SIDE

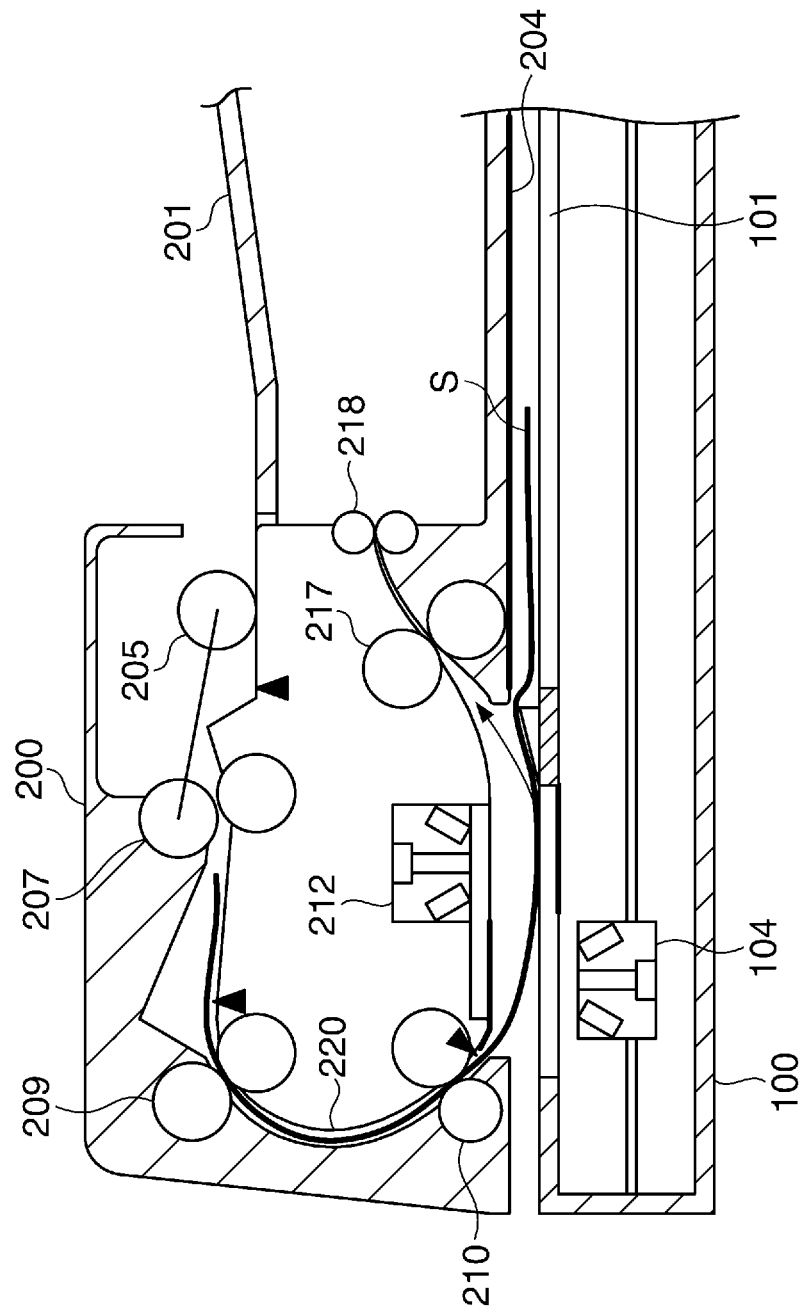

IMAGE READING APPARATUS CAPABLE OF DETERMINING OPENING-CLOSING STATE OF ORIGINAL CONVEYANCE DEVICE AND IMAGE FORMING APPARATUS EQUIPPED WITH IMAGE READING APPARATUS

BACKGROUND OF THE INVENTION

Field of the Invention

The present invention relates to an image reading apparatus that is provided with an original conveyance device and an image reading apparatus body, and an image forming apparatus equipped with the image reading apparatus concerned. Particularly, the present invention relates to the image reading apparatus that is capable of determining an opening-closing state of the original conveyance device that is pivotally mounted on an upper portion of the image reading apparatus body, and the image forming apparatus equipped with the image reading apparatus concerned.

Description of the Related Art

In an image reading apparatus equipped with an original conveyance device (an automatic document feeder, hereinafter, referred to as an "ADF"), the ADF is mounted on a reading apparatus body that reads an original. One side of an under face of the ADF is pivotally attached to one side of an upper face of the reading apparatus body through a hinge member. Accordingly, the ADF is pivotable upon the hinge member as a pivot. When the ADF is closed and covers a platen, which is the upper face of the reading apparatus body, a pressure plate at the under face of the ADF presses an original placed on the platen, the image reading apparatus will be ready to read.

An image forming apparatus equipped with an ADF that exposes and covers a platen of a reading apparatus body is usually provided with a flag-type opening-closing detection sensor for detecting opening and closing of the ADF. The flag-type opening-closing detection sensor has a projection member and is arranged near a hinge member. When the ADF opens, the projection member is projected and the sensor detects opening of the ADF. When the ADF is closed, the projection member is pressed by the under face of the ADF and the sensor detects closing of the ADF.

However, the flag-type opening-closing detection sensor merely determines whether the opening angle of the ADF is larger than a predetermined angle. Accordingly, even if a thick original is placed on the platen and a pressure plate at the under face of the ADF (hereinafter referred to as the "ADF", simply) is floated slightly from the platen, the flag-type opening-closing detection sensor determines that the ADF is closed. Then, when a moving original is read with the ADF in the state where the ADF is floated slightly, paper jam occurs due to the floating of the ADF, at least one of the original in the ADF and the original on the platen may be damaged.

Against this, for example, Japanese Laid-Open Patent Publications (Kokai) No. 2014-011766 (JP 2014-011766A), No. 2006-025284 (JP 2006-025284A), and No. 2010-278563 (JP 2010-278563A) disclose techniques that detect the state where the ADF is floated slightly that cannot be detected by the flag-type opening-closing detection sensor. The techniques move a movable image reader to a moving-original-reading position or to a position under a platen glass, read a pressure plate or an ADF counter member, and detect the opening/closing state of the ADF on the basis of the obtained luminance value or the size relation of the reading sizes of two white marks attached to front and rear sides of the ADF.

However, when the opening/closing state of the ADF is detected by reading the pressure plate or the ADF counter member using the movable image reader, it is necessary to move the image reader from a standby position to the moving-original-reading position or to the position under the platen glass. Accordingly, the time during which the image reader moves to the moving-original-reading position is needed.

SUMMARY OF THE INVENTION

Accordingly, a first aspect of the present invention provides an image reading apparatus including a first unit, a second unit that is pivotable against the first unit, and a controller. The first unit includes a platen on which an original is placed, a member, and a first reader that is movable in a predetermined direction and reads a first side of an original. The second unit includes an original tray on which an original is stacked, a conveyance unit configured to convey an original stacked on the original tray along a conveyance path, and a second reader that reads a second face that differs from the first side of the original conveyed by the conveyance unit. The controller determines an opening/closing state of the second unit against the first unit based on read data obtained when the second reader reads the member disposed in the first unit. The first reader reads the first side of the original conveyed by the conveyance unit at a first read position and the second reader reads the second side of the original at a second read position that differs from the first read position in a case where the original placed on the original tray is read. The first reader reads the first side of the original while moving under the original in the predetermined direction in a case where the original placed on the platen is read.

Accordingly, a second aspect of the present invention provides an image forming apparatus including the first unit, second unit, and control unit of the first aspect, and an image forming unit configured to form an image on a recording sheet using image data of an original read by the first reader and the second reader.

Further features of the present invention will become apparent from the following description of exemplary embodiments with reference to the attached drawings.

BRIEF DESCRIPTION OF THE DRAWINGS

FIG. 8 is a partial sectional view of the image reading apparatus in FIG. 1 where jam occurs due to a gap between the ADF and a reading apparatus body.

DESCRIPTION OF THE EMBODIMENTS

Hereafter, embodiments according to the present invention will be described in detail with reference to the drawings.

Figure 1:
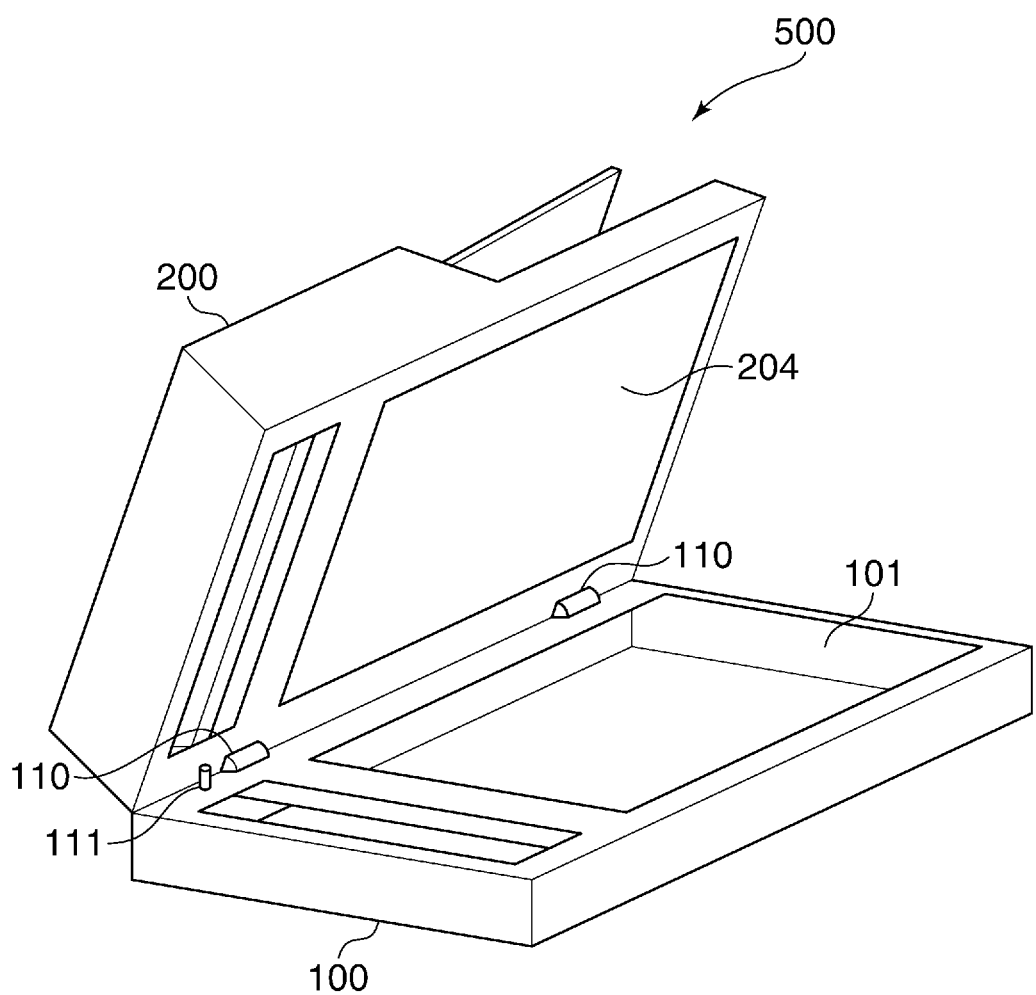
FIG. 1 is a perspective view showing an image reading apparatus according to a first embodiment of the present invention.
Figure 2:
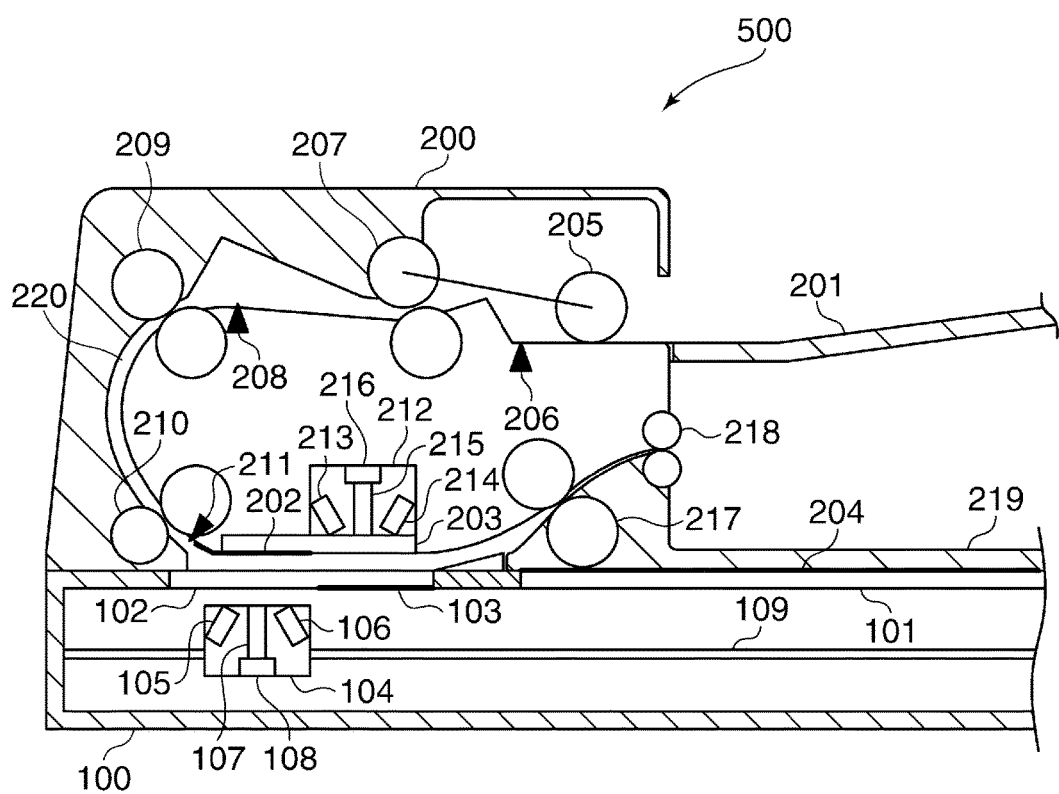
FIG. 2 is a longitudinal sectional view schematically showing a configuration of the image reading apparatus shown in FIG. 1.

FIG. 1 is a perspective view showing an image reading apparatus 500 according to a first embodiment. FIG. 2 is a longitudinal sectional view schematically showing a configuration of the image reading apparatus 500 shown in FIG. 1. The image reading apparatus 500 constitutes a part of an image forming apparatus that reads an original image and forms an image on a recording sheet on the basis of the read image data, for example.

As shown in FIG. 1, the image reading apparatus 500 mainly consists of a reading apparatus body (a first unit) 100 that reads an original, and an original conveyance device (an ADF, a second unit) 200 that conveys an original toward the reading apparatus body 100. The ADF 200 is disposed on the reading apparatus body 100. A pressure plate 204 attached to the under face of the ADF 200 presses an original placed on a platen glass (platen) 101 of the reading apparatus body 100.

The ADF 200 is pivotally supported with opening-closing hinges (pivots) 110 disposed on the upper far side of the reading apparatus body 100. The ADF 200 exposes and covers the upper face of the platen by pivoting around the opening-closing hinges 110. An opening-closing detector 111 is arranged near one of the opening-closing hinges 110. The opening-closing detector 111 detects whether the ADF 200 is in an "opened state" where the ADF 200 opens the upper face of the platen or the ADF 200 is in a "closed state" where the under face of the ADF 200 covers the upper face of the platen. It should be noted that the "closed state" is a concept including a "completely closed state" and a "floated state" mentioned later.

As shown in FIG. 2, the reading apparatus body 100 is provided with the platen glass 101 arranged on the upper face, a front-side moving-original reading glass 102, a back-side counter member 103, and a front-side reader (a first reader) 104 that moves in a horizontal direction in FIG. 1 along a moving guide 109 under the platen glass 101. The front-side moving-original reading glass 102 is constituted integrally with the back-side counter member 103 that functions as a reflective surface. The front-side reader 104 is provided with front-side LEDs 105 and 106 as light sources, a front-side lens 107, and a front-side line sensor 108. The front-side reader 104 is driven by a scanning motor 305 (see FIG. 4) to move along the moving guide 109.

The front-side reader 104 reads an original placed on the platen glass 101 line by line while moving in the horizontal direction in FIG. 1 along the moving guide 109. Moreover, the front-side reader 104 reads an original that is conveyed onto the front-side moving-original reading glass 102 by the ADF 200 in a state where the front-side reader 104 is arranged under the front-side moving-original reading glass 102 as shown in FIG. 2.

The ADF 200 is provided with an original tray 201 on which an original bundle is stacked, a separation roller pair 207 as a separator, and a pickup roller 205. The separation roller pair 207 prevents the original bundle from moving downstream beyond the original tray 201 before the start of conveyance of an original, An original sensor 206 as an original detector is disposed in the original tray 201.

A loop-shaped conveyance path 220 along which an original is conveyed to a sheet ejection tray 219 is formed at the downstream side of the separation roller pair 207. A registration roller pair 209, upstream reading roller pair 210, downstream reading roller pair 217, and ejecting roller pair 218 are arranged in order along the conveyance path 220. These roller pairs constitute a conveyance unit. A back-side moving-original reading glass 203 is arranged in the conveyance path 220 at a position opposite to the front-side moving-original reading glass 102 of the reading apparatus body 100. A back-side reader (second reader) 212 is fixed on the back-side moving-original reading glass 203 at a position opposite to the back-side counter member 103. A front-side counter member 202 is disposed in the bottom of the back-side moving-original reading glass 203 at a position adjacent to the back-side reader 212. The back-side reader 212 is fixed so as to be seen from the under face of the ADF 200. The back-side reader 212 reads a back side of an original through the back-side moving-original reading glass 203.

The back-side reader 212 is provided with back-side LEDs 213 and 214 as light sources, a back-side lens 215, and a back-side line sensor 216. A read portion is nipped by the front-side moving-original reading glass 102 and the back-side moving-original reading glass 203. A registration sensor 208 is arranged at the upstream side of the registration roller pair 209. A read sensor 211 is arranged at the upstream side of the read position.

Figure 3A:
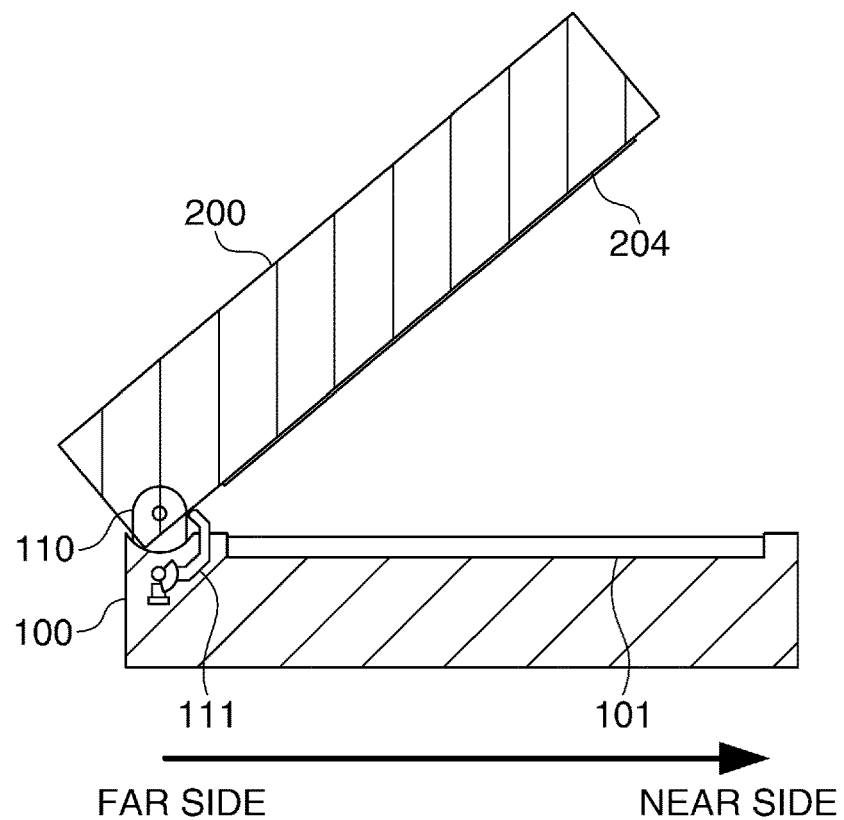
FIG. 3A is a sectional view schematically showing a portion of the image reading apparatus in which an opening-closing detector for an ADF is disposed.
Figure 3B:
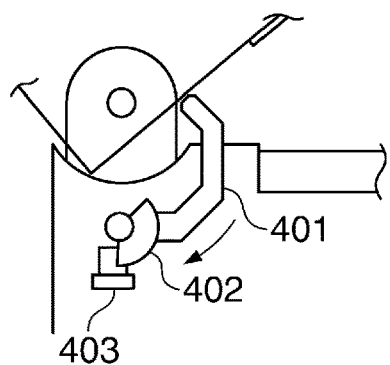
FIG. 3B and FIG. 3C are enlarged views showing operations of the opening-closing detector.
Figure 3C:
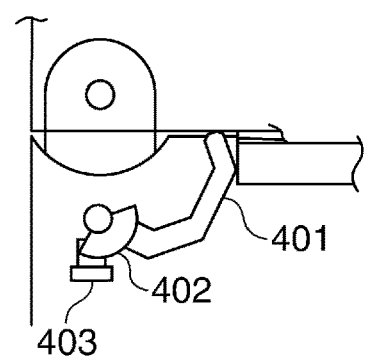

FIG. 3A is a sectional view schematically showing a portion of the image reading apparatus 500 in which an opening-closing detector for the ADF 200 is disposed. FIG. 3B and FIG. 3C are enlarged views showing operations of the opening-closing detector.

The opening-closing detector 111 arranged near the opening-closing hinge 110 mainly consists of a rotatable contact arm 401, a sensor interference member 402, and a sensor 403, as shown in FIG. 3B. The contact arm 401 is energized by a spring (not shown) so that a part of the contact arm 401 jumps out from the upper face of the reading apparatus body 100.

When the ADF 200 is closed, the part of the contact arm 401 contacts with the under face of the ADF 200 and is pushed downward by rotating in an arrow direction in FIG. 3B (FIG. 3C). The sensor 403 is a transmission optical sensor equipped with a light emitting element and light receiving element (not shown). When the ADF 200 is closed, the sensor interference member 402 that is united with the contact arm 401 that rotates by pressure of the ADF 200 blocks the light path between the light emitting element and the light receiving element. That is, when the sensor interference member 402 blocks off the light toward the light receiving element of the sensor 403, the sensor 403 detects the closed state of the ADF 200. The state where the light receiving element of the sensor 403 of the opening-closing detector 111 is blocked by the sensor interference member 402 (i.e., the state where the ADF 200 is closed) is referred to as an ON state of the opening-closing detector 111.

Next, a configuration of a control system of the image reading apparatus 500 in FIG. 1 will be described.

Figure 4:
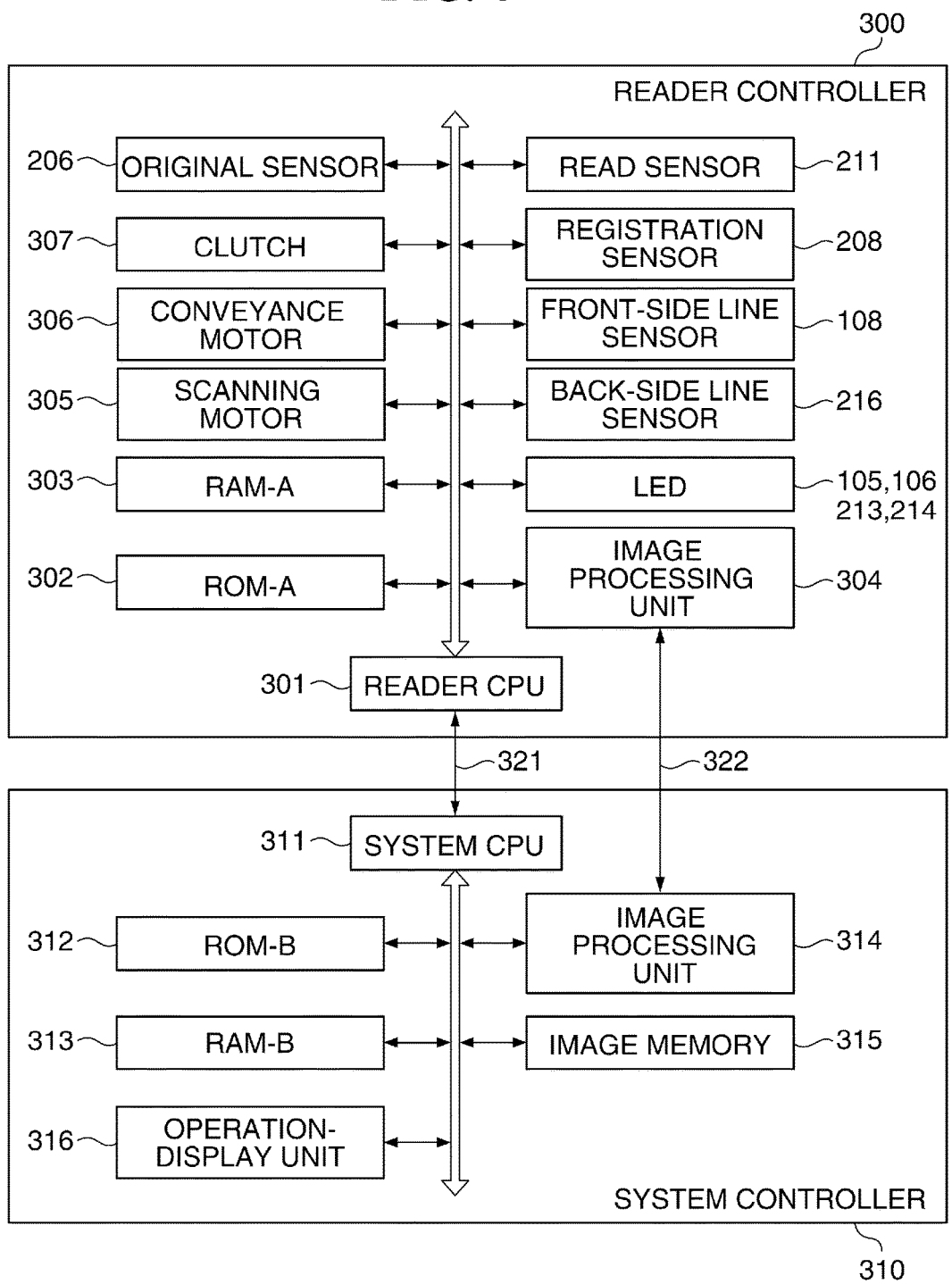
FIG. 4 is a block diagram schematically showing a control system of the image reading apparatus shown in FIG. 1.

FIG. 4 is a block diagram schematically showing a control system of the image reading apparatus 500 in FIG. 1.

As shown in FIG. 4, the image reading apparatus 500 is provided with a reader controller 300 and a system controller 310.

The reader controller 300 is provided with a reader CPU 301 that is a central processor unit, a ROM-A 302 that is a read-only memory, and a RAM-A 303 that is a random access memory. Moreover, the reader controller 300 is provided with the scanning motor 305, a conveyance motor 306, a clutch 307, the original sensor 206, the read sensor 211, the registration sensor 208, the front-side line sensor 108, and the back-side line sensor 216. Moreover, the reader controller 300 is provided with LEDs 105, 106, 213, and 214 and an image processing unit 304. These constructional elements are respectively connected to the reader CPU 301 through a bus in order to achieve an image read function.

The reader CPU 301 controls each constructional element, and runs various programs according to flowcharts mentioned later. The control program is stored in the ROM-A 302. Input data and working data are stored in the RAM-A 303. The conveyance motor 306 is a pulse motor that drives each of the rollers for conveyance, and achieves an original-conveyance function. The clutch 307 connects and disconnects the registration roller pair 209 with the conveyance motor 306 to switch drive and stop of the registration roller pair 209. The reader CPU 301 manages the pulse of each motor by controlling the number of driving pulses. The pulse number is regarded as a moving amount of an original under conveyance.

The original sensor 206 detects whether any original is placed on the original tray 201. The registration sensor 208 and the read sensor 211 detect an original on the conveyance path. The reader CPU 301 detects length of an original under conveyance on the basis of the number of driving pulses of the conveyance motor 306 counted after the read sensor 211 turns ON until it turns OFF. The front-side line sensor 108 and the back-side line sensor 216 respectively read images on a front side and back side of an original.

The reader CPU 301 controls the image processing unit 304 to apply a shading process and various filtering processes to the image data read with the front-side line sensor 108 and the back-side line sensor 216.

The system controller 310 is provided with a system CPU 311, ROM-B 312, RAM-B 313, image processing unit 314, image memory 315, and operation-display unit 316. Interface control by a user is performed by controlling the system CPU 311 through the operation-display unit 316.

The system controller 310 gives and receives the data about the image reading control with the reader CPU 301 through a controller IF 321 as a communication line. For example, the reader CPU 301 notifies the system controller 310 of a vertical synchronization signal as a reference of a front end of original image data and a horizontal synchronizing signal as a reference a front end of pixels of one line in synchronization with an original-reading timing through the controller IF 321.

Moreover, the image data processed by the image processing unit 304 in the reader controller 300 is transmitted to the image processing unit 314 in the system controller 310 through an image line 322. The image processing unit 314 applies a predetermined image process, such as color determination. After that, the processed image data is stored into the image memory 315.

In the image reading apparatus 500 of such a configuration, an original image is read as follows.

That is, the pickup roller 205 contacts to the uppermost original of the original bundle stacked on the original tray 201 and rotates to start conveyance. Even if a plurality of originals are conveyed by the pickup roller 205, the uppermost one sheet of the originals is separated and conveyed by the function of the separation roller pair 207. The original separated by the separation roller pair 207 is conveyed to the registration roller pair 209, and is bumped to the registration roller pair 209. The front end of the bumped original bends as a loop shape, and accordingly skew of the original is canceled.

The original of which the skew was canceled by the registration roller pair 209 is conveyed by the upstream reading roller pair 210 to the read position between the front-side moving-original reading glass 102 and the back-side moving-original reading glass 203. When the original conveyed to the read position passes under the front-side counter member 202 that is united with the back-side moving-original reading glass 203 in a front-side reading mode, the original is irradiated by the front-side LEDs 105 and 106 of the front-side reader 104 through the front-side moving-original reading glass 102. The reflected light that is reflected by the front side of the original that is irradiated by the front-side LEDs 105 and 106 is read by the front-side line sensor 108 through the front-side lens 107. As a result, the front side image of the original is read.

Moreover, in a double-sided reading mode, the front side image of the original is read by the front-side reader 104 as mentioned above. When a back side image is read on the other hand, the back side of the original is irradiated by the back-side LEDs 213 and 214 of the back-side reader 212 when the original passes over the back-side counter member 103 that is united with the front-side moving-original reading glass 102. The reflected light that is reflected by the back side of the original that is irradiated by the back-side LEDs 213 and 214 is read by the back-side line sensor 216 through the back-side lens 215. As a result, the back side image of the original is read. The original of which the original image was read is conveyed by the downstream reading roller pair 217, and is ejected to the sheet ejection tray 219 through the ejecting roller pair 218. Although a CIS (Contact Image Sensor) as shown in FIG. 2 is used as a component member of the front-side reader 104 and the back-side reader 212, a reduction optical system that uses a mirror, lens, and CCD etc. may be employed in place of the CIS.

Next, an image reading process with the image reading apparatus 500 shown in FIG. 1 will be described.

Figure 5:
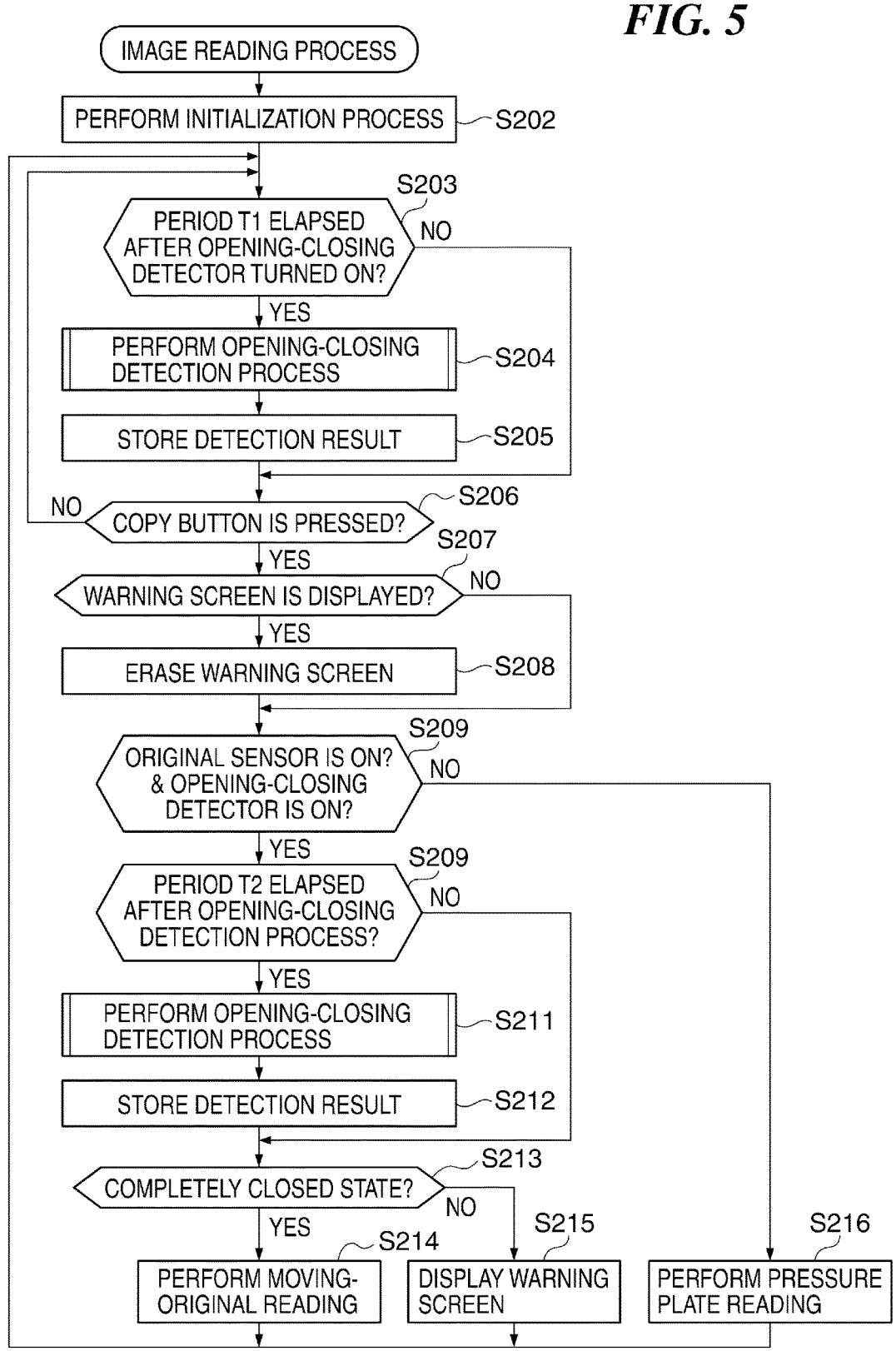
FIG. 5 is a flowchart showing procedures of an image reading process using the image reading apparatus shown in FIG. 1.

FIG. 5 is a flowchart showing procedures of the image reading process using the image reading apparatus 500 shown in FIG. 1. The reader CPU 301 of the reader controller 300 in the image reading apparatus 500 performs this image reading process according to an image reading program stored in the ROM-A 302.

As shown in FIG. 5, when the power is applied to the image reading apparatus 500 and the image reading process is started, the reader CPU 301 performs an initialization process of the image reading apparatus 500 first (step S202). Specifically, the reader CPU 301 adjusts the light amounts of the front-side LEDs 105 and 106 of the front-side reader 104 and the back-side LEDs 213 and 214 of the back-side reader 212. Moreover, the reader CPU 301 performs an image adjustment process to adjust gain and offset for adjusting levels of image signals received from the front-side line sensor 108 and the back-side line sensor 216. Moreover, the reader CPU 301 performs an initialization process that initializes the mechanical structure. For example, the pickup roller 205 is lifted up and the front-side reader 104 is moved to the standby position.

After the initialization process is completed, the reader CPU 301 determines whether a predetermined period T1 elapsed after the opening-closing detector 111 varied from OFF (opened state) to ON (closed state) in step S203. As a result of the determination in the step S203, when the predetermined period T1 elapsed ("YES" in the step S203), the reader CPU 301 performs the opening-closing detection process for the ADF (step S204). The opening-closing detection process will be later described in detail using a drawing.

After the opening-closing detection process for the ADF is completed, the reader CPU 301 stores a detection result into the RAM-A 303 (step S205). Next, the reader CPU 301 determines whether a user pressed a copy button (step S206). As a result of the determination in the step S206, when the user pressed the copy button ("YES" in the step S206), the reader CPU 301 determines whether a warning screen (mentioned later), which warns that the ADF is in the floated state, is being displayed on the operation-display unit 316 (step S207). As a result of the determination in the step S207, the warning screen is being displayed on the operation-display unit 316 ("YES" in the step S207), the reader CPU 301 erases the warning screen (step S208).

That is, the reader CPU 301 controls the operation-display unit 316 through the system CPU 311 to erase the warning screen. After that, the reader CPU 301 determines whether the original existence sensor 206 and opening-closing detector 111 are in the ON state (step S209). As a result of this, the reader CPU 301 determines whether any original is being placed on the original tray 201 and whether the ADF is not in the opened state (i.e., the ADF is in the completely closed state or the floated state). The floated state of the ADF means that the pressure plate 204 of the ADF 200 is floated slightly from the platen glass 101 because an original of which thickness is more than a predetermined thickness is placed on the platen glass 101 of the reading apparatus body 100, for example. Moreover, the completely closed state of the ADF means that the pressure plate 204 of the ADF 200 is not floated from the platen glass 101.

As a result of the determination in the step S209, when any original is placed on the original tray 201 and the ADF is in the completely closed state or floated state ("YES" in the step S209), the reader CPU 301 proceeds with the process to step S210. The reader CPU 301 determines whether the opening-closing detection process was performed before pressing the copy button. When the opening-closing detection process was performed, the reader CPU 301 determines whether a predetermined period T2 elapsed after the opening-closing detection process concerned was performed (step S210). As a result of the determination in the step S210, when the opening-closing detection process was not performed or the predetermined period T2 elapsed after performing the process ("YES" in the step S210), the reader CPU 301 performs the opening-closing detection process for the ADF (step S211). The opening-closing detection process will be described below. Next, the reader CPU 301 stores the detection result of the opening-closing detection process into the RAM-A 303 (step S212).

Next, the reader CPU 301 determines whether the ADF 200 is in the completely closed state on the basis of the latest detection result of the opening-closing detection process. As a result of the determination in the step S213, when the ADF is in the completely closed state ("YES" in the step S213), the reader CPU 301 performs moving-original reading (reads the moving original) using the ADF 200 (step S214). On the other hand, as a result of the determination in the step S213, when the ADF 200 is not in the completely closed state but in the floated state ("NO" in the step S213), the reader CPU 301 displays the warning screen shown in FIG. 6 on the operation-display unit 316 (step S215). As a result of this, the reader CPU 301 urges the user to cancel the floated state of the ADF and to reinput a control instruction.

On the other hand, as a result of the determination in the step S209, when the original sensor 206 or the opening-closing detector 111 is in the OFF state ("NO" in the step S209, there is no original or the ADF 200 is in the opened state), the reader CPU 301 proceeds with the process to step S216. That is, the reader CPU 301 shifts to a pressure plate reading mode (static original reading mode), and performs pressure plate reading (reads the static original on the platen glass 101) in step S216.

Moreover, as a result of the determination in the step S203, when it is not detected that the ADF 200 was closed or when the predetermined period T1 does not elapse after detecting that the ADF 200 was closed, the reader CPU 301 proceeds with the process to the step S206. That is, the reader CPU 301 does not perform the opening-closing detection process for the ADF, determines whether the copy button was pressed (step S206), and repeats the process in the steps S203 through S205 until the copy button is pressed.

Moreover, as a result of the determination in the step S207, when the warning screen is not displayed ("NO" in the step S207), the reader CPU 301 proceeds with the process to the step S209.

Moreover, as a result of the determination in the step S210, when the predetermined period T2 does not elapse after the opening-closing detection process for the ADF before pressing the copy button ("NO" in the step S210), the reader CPU 301 proceeds with the process to the step S213 without performing the opening-closing detection process.

According to the process in FIG. 5, when an original is placed on the original tray 201 and the ADF 200 is closed ("YES" in the step S209), the opening-closing detection process for the ADF 200 is performed (step S211). This enables the suitable reading operation corresponding to the opening/closing state of the ADF.

That is, when the ADF is in the completely closed state, the moving original is read using the ADF (step S214), and when the ADF is in the floated state, the warning screen is displayed (step S215). Moreover, when the original is not placed on the original tray 201 or when the ADF 200 is not closed, the pressure plate reading is performed (step S216).

Next, the opening-closing detection process performed in the steps S204 and S211 in FIG. 5 will be described. Before describing the concrete process contents, the meaning of the opening-closing detection process will be described first.

Figure 7A:
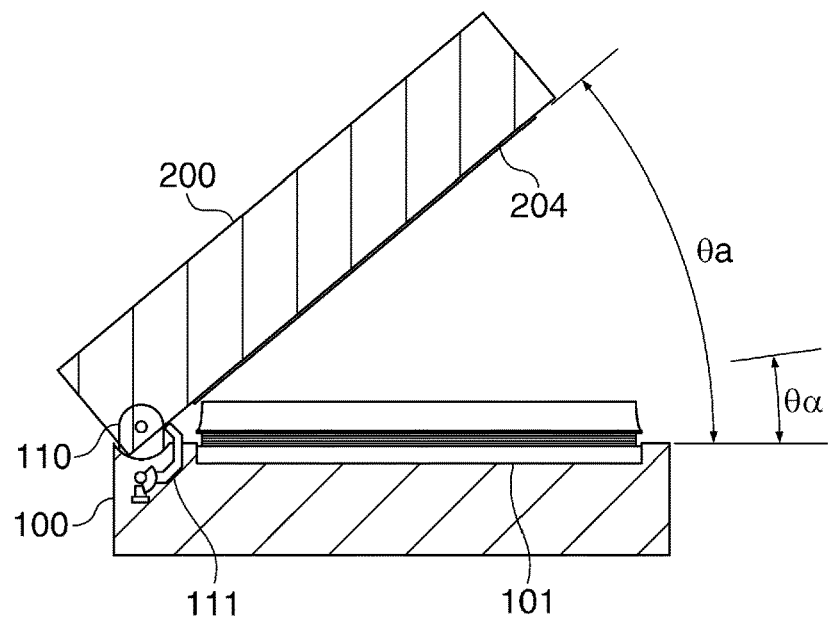
FIG. 7A is a sectional view schematically showing the image reading apparatus in FIG. 1 where the ADF is in an opened state.
Figure 7B:
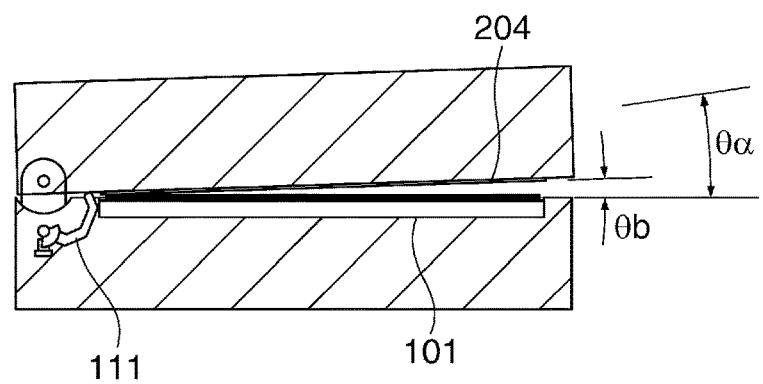
FIG. 7B is a sectional view schematically showing the image reading apparatus in FIG. 1 where the ADF is in a floated state.
Figure 7C:
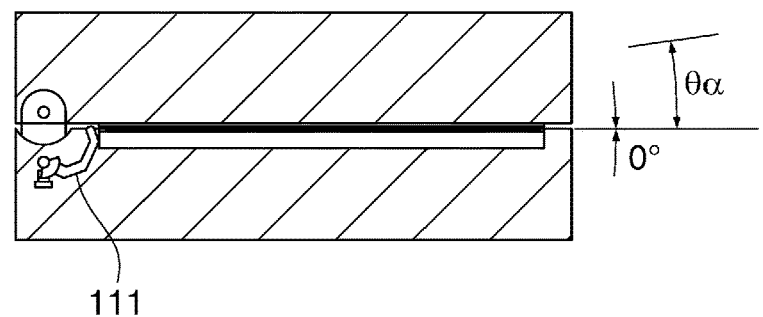
FIG. 7C is a sectional view schematically showing the image reading apparatus in FIG. 1 where the ADF is in a completely closed state.

FIG. 7A is a sectional view schematically showing the image reading apparatus 500 in FIG. 1 where the ADF is in the opened state, FIG. 7B is a sectional view schematically showing the image reading apparatus 500 in FIG. 1 where the ADF is in the floated state, and FIG. 7C is a sectional view schematically showing the image reading apparatus 500 in FIG. 1 where the ADF is in the completely closed state.

As shown in FIG. 7B and FIG. 7C, when the angle formed between the platen glass 101 of the reading apparatus body 100 and the pressure plate 204 at the bottom of the ADF 200 becomes equal to or smaller than a predetermined angle θα, the opening-closing detector 111 becomes the ON state (see FIG. 3C) and detects that the ADF is closed.

The predetermined angle θα is determined on the basis of the shapes of the contact arm 401, the sensor-interference-member 402, etc. that are the components of the opening-closing detector 111. However, the minimum detection angle that can be set up is 5 through 15 degrees, for example, because of assembling errors of the contact arm 401, sensor interference member 402, sensor 403, and ADF 200. Accordingly, when an original like a shin booklet is placed on the platen glass 101 and the opening angle of the ADF 200 becomes less than the predetermined angle θα of the opening-closing detector 111 as shown in FIG. 7B for example, the detection signal of the opening-closing detector 111 is in the ON state. Then, the reader CPU 301 determines that the ADF 200 is in the closed state on the basis of the detection signal of the opening-closing detector 111, and controls the ADF 200 to start conveying an original on the original tray 201. However, in the floated state (FIG. 7B) where the original like a thin booklet is placed on the platen glass 101, since a gap exists between the pressure plate 204 and the platen glass 101, the original S may invade into the gap concerned and jam may occur as shown in FIG. 8.

FIG. 8 is a partial sectional view of the image reading apparatus in FIG. 1 where jam occurs due to a gap between the ADF and the reading apparatus body.

In order to prevent occurrence of such jam, the opening-closing detection process that determines whether the ADF is floated from the platen glass 101 of the reading apparatus body 100 is performed in the embodiment. Then, when the ADF is in the floated state, the warning screen is displayed to urge a user to cancel the floated state.

Hereinafter, the concrete content of the opening-closing detection process for the ADF performed in the embodiment will be described.

Figure 9:
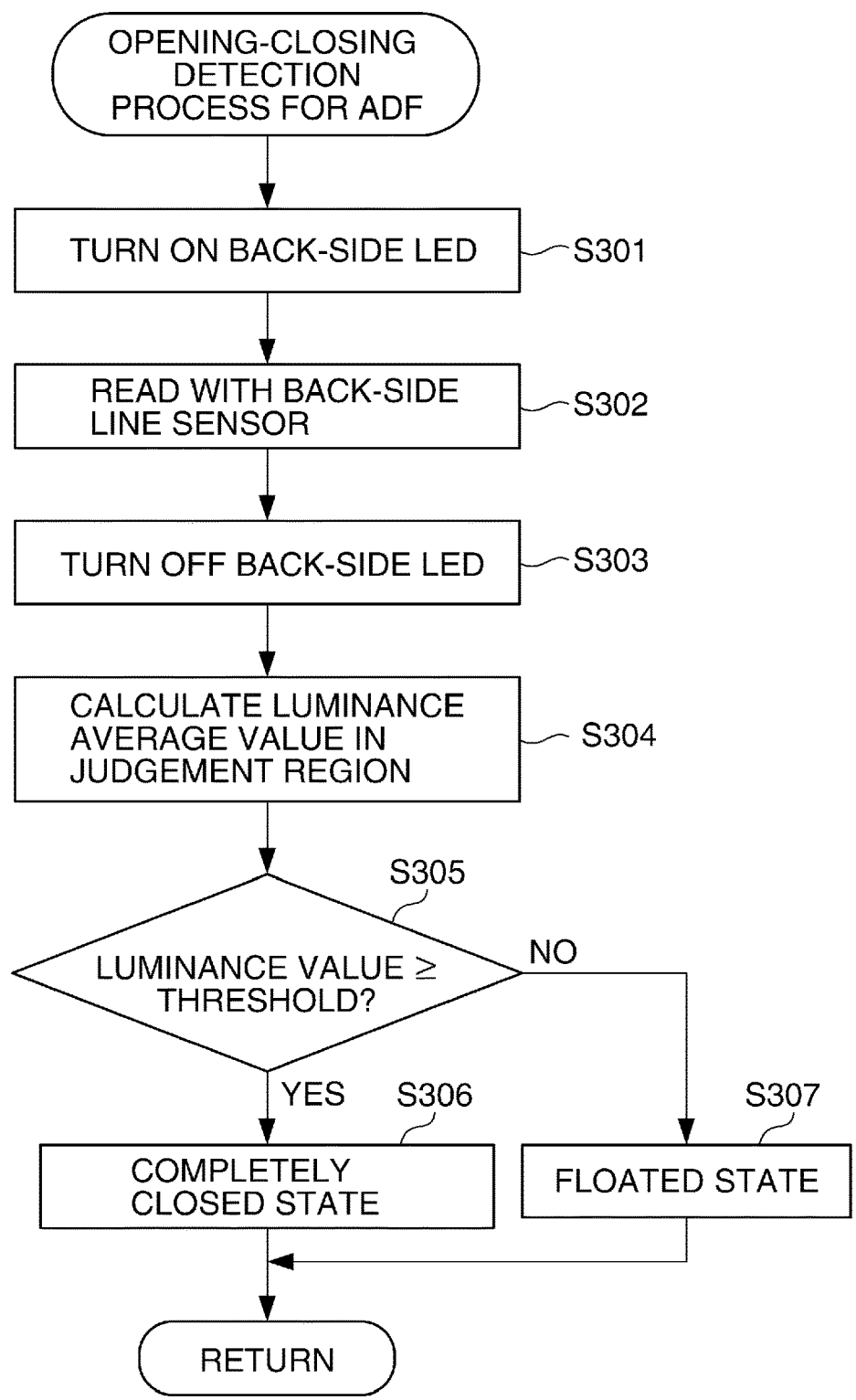
FIG. 9 is a flowchart showing procedures of an opening-closing detection process for the ADF performed in the step S204 or S211 in FIG. 5.

FIG. 9 is a flowchart showing procedures of the opening-closing detection process for the ADF performed in the step S204 or S211 in FIG. 5.

The reader CPU 301 of the reader controller 300 in the image reading apparatus 500 performs the opening-closing detection process for the ADF according to an opening-closing detection program for the ADF stored in the ROM-A 302.

When the opening-closing detection process for the ADF is started, the reader CPU 301 turns ON the back-side LEDs 213 and 214 of the back-side reader 212 to irradiate the back-side counter member 103 of the reading apparatus body at the read position (step S301). Next, the reader CPU 301 controls the back-side line sensor 216 to read the reflected light that is emitted from the back-side LEDs 213 and 214, and is reflected by the back-side counter member 103 through the back-side lens 215 (step S302). After reading the reflected light from the back-side counter member 103, the reader CPU 301 quickly turns OFF the back-side LEDs 213 and 214 so as not to leak light outside more than needed (step S303).

Next, the reader CPU 301 calculates a luminance average value (hereinafter referred to as a "luminance value", simply) of the reflected light from the back-side counter member 103 in a plurality of pixels included in a judgment region A set in the back-side line sensor 216 (step S304).

The judgment region A is a part of the pixels of the back-side line sensor 216. The judgment region A is arbitrarily set up in order to measure the luminance value of reflected light that is emitted from the back-side LEDs 213 and 214 and is reflected by the back-side counter member 103.

Figure 10:
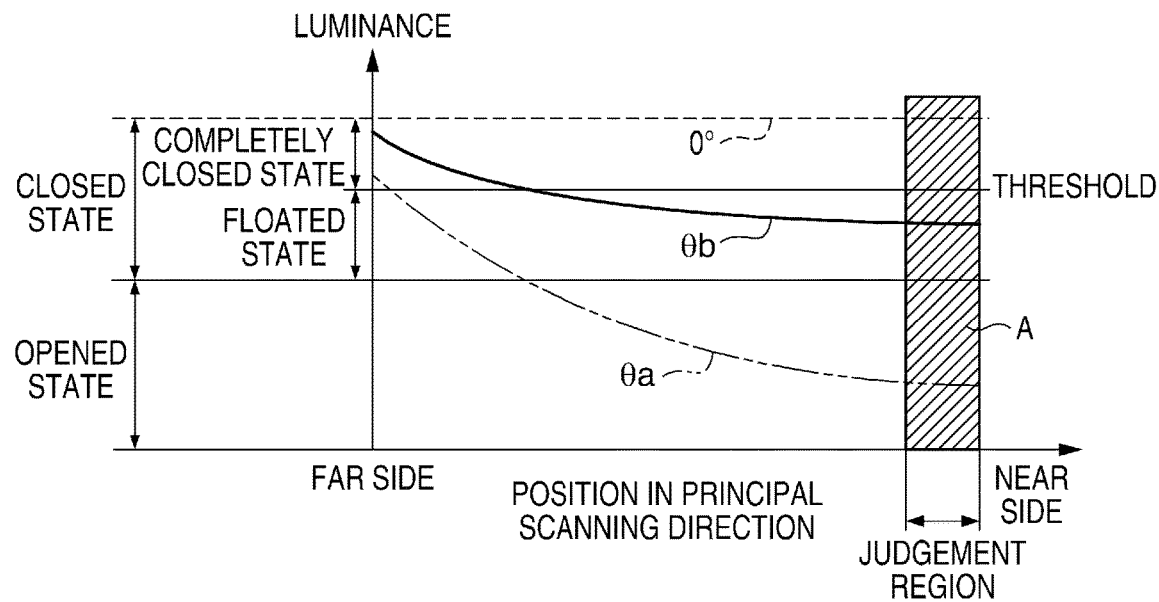
FIG. 10 is a graph showing a relationship between a luminance of reflected light from a back-side counter member that is detected at each position of a back-side line sensor shown in FIG. 2 in a principal scanning direction and the opening/closing state of the ADF.

FIG. 10 is a graph showing a relationship between a luminance of reflected light from the back-side counter member 103 that is detected at each position of the back-side line sensor 216 in a principal scanning direction and the opening/closing state of the ADF. As shown in FIG. 10, the judgment region A is set as the pixel group at the near side of the back-side line sensor 216 that is farthest from the far side of the reading apparatus body 100 (i.e., the side of the opening-closing hinge 110 that pivotally attach the ADF 200 to the reading apparatus body 100). The luminance value of the reflected light in the judgment region A is found, and the opening/closing state of the ADF is determined as compared with a threshold.

The reason why the judgment region A is set at the near side that is farthest from the far side of the reading apparatus body 100 will be described with reference to FIG. 11.

Figure 11:
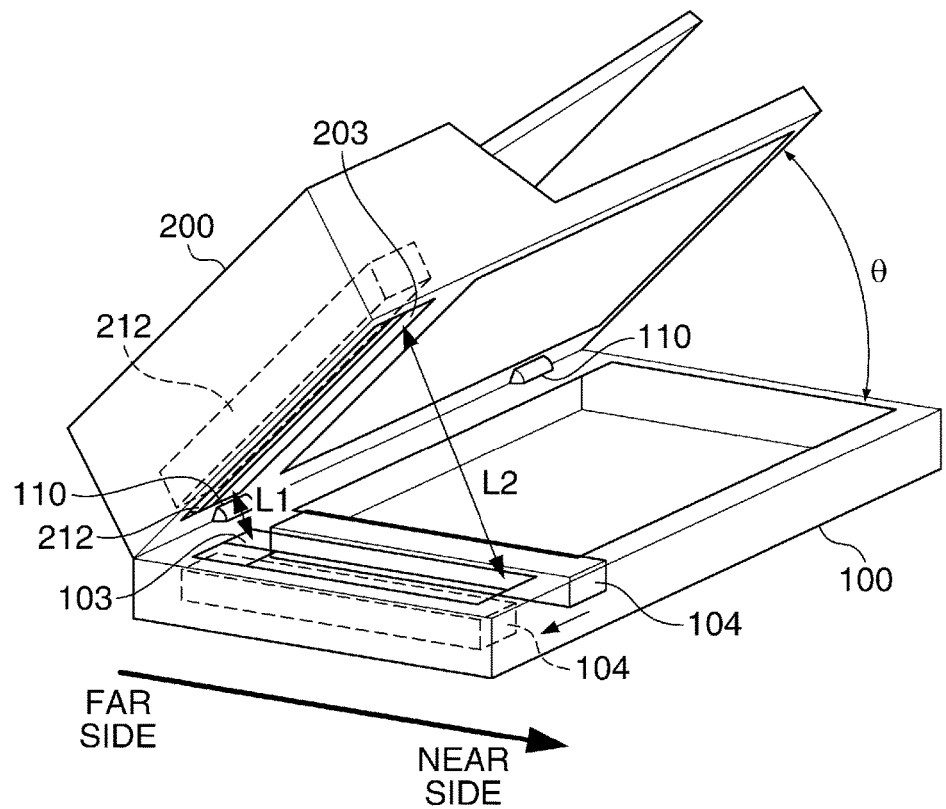
FIG. 11 is a perspective view of the image reading apparatus showing a positional relationship between a back-side reader shown in FIG. 2 and the back-side counter member.

FIG. 11 is a perspective view of the image reading apparatus showing a positional relationship between the back-side reader 212 and the back-side counter member 103. As shown in FIG. 11, the back-side counter member 103 is disposed in the reading apparatus body 100 so as to face the back-side reader 212 disposed in the ADF 200. The back-side counter member 103 is high reflectance color, such as white.

When the ADF 200 opens, the back-side counter member 103 is apart from the back-side reader 212. When the back-side reader 212 irradiates the back-side counter member 103 and measures the reflected light in this state, the luminance level of the reflected light decreases as the distance from the back-side reader 212 increases. The distance between the back-side reader 212 and the back-side counter member 103 increases as the distance from the opening-closing hinge 110 increases and as the opening angle of the ADF increases, as shown in FIG. 11. That is, the luminance level of the reflected light from the back-side counter member 103 decreases and its change rate increases as the distance from the opening-closing hinge 110 increases and as the opening angle increases. Accordingly, in the embodiment, the judgment region A is set at the near side that is farthest from the opening-closing hinge 110 in which the change rate of the luminance level is maximized as mentioned above.

Referring back to FIG. 9, after calculating the luminance value of the reflected light in the judgment region A (step S304), the reader CPU 301 determines whether the calculated luminance value is equal to or more than a predetermined threshold (third threshold) in step S305. As a result of the determination in the step S305, when the luminance value is equal to or more than the threshold ("YES" in the step S305), the reader CPU 301 determines that the ADF 200 is in the completely closed state (step S306), and finishes this process.

On the other hand, as a result of the determination in the step S305, when the luminance value is less than the predetermined threshold ("NO" in the step S305), the reader CPU 301 determines that the ADF 200 is in the floated state (step S307), and finishes this process. It should be noted that the opening-closing detection process is premised that the opening-closing detector 111 detected the closed state of the ADF in the step S203 or S209, for example. Accordingly, there is no determination result that the ADF is in the opened state.

According to the process in FIG. 9, it is determined whether the ADF is in the floated state or the completely closed state by measuring the luminance value of the reflected light from the back-side counter member 103 using the back-side reader 212 that is fixed so as to be seen from the under face of the ADF 200. This reduces the period during which the reader is moved to the read position as compared with the conventional technique. Accordingly, when the opening-closing detection is performed before starting to read, the opening/closing state of the ADF is detected correctly without increasing FCOT (First Copy Out time), and occurrence of jam is prevented by avoiding the floated state of the ADF.

That is, the conventional technique detects the opening/closing state of the ADF by finding the luminance value of the reflected light from the front-side counter member 202 disposed in the ADF 200 using the movable front-side reader 104 disposed in the reading apparatus body 100. However, when the luminance value of the reflected light from the front-side counter member 202 is found using the front-side reader 104, the front-side reader 104 needs to move from the standby position (solid line) to the read position (broken line) as shown in FIG. 11. For this reason, the FCOT became longer due to the moving time of the front-side reader 104.

On the other hand, the embodiment detects the opening/closing state of the ADF using the back-side reader 212 fixed at the read position. This shortens the FCOT because the time for moving the reader to the read position is omissible.

Moreover, the opening-closing detection process for the ADF is performed in advance of the original reading operation after detecting the closed state of the ADF using the opening-closing detector 111. As a result of this, the FCOT does not increase significantly as compared with a case where the opening/closing state of the ADF is detected using the opening-closing detector 111 only.

Although the judgment region A is set at the near side (see FIG. 10) of the reading apparatus body 100 in the back-side line sensor 216 in the embodiment, it is not limited to this. A judgment region may be set at the far side of the reading apparatus body 100. Judgment regions may be respectively set at the far side and near side, and the floated state of the ADF may be determined using difference of average luminance values from both the judgement regions.

Next, a second embodiment of the present invention will be described. The hardware configuration of the image reading apparatus according to the second embodiment is the same as that of the image reading apparatus 500 according to the first embodiment shown in FIG. 1 and FIG. 2 except for not having the opening-closing detector 111. The control system of the second embodiment differs from that of the first embodiment. Hereinafter, the second embodiment will be described focusing on the difference from the first embodiment.

Figure 12:
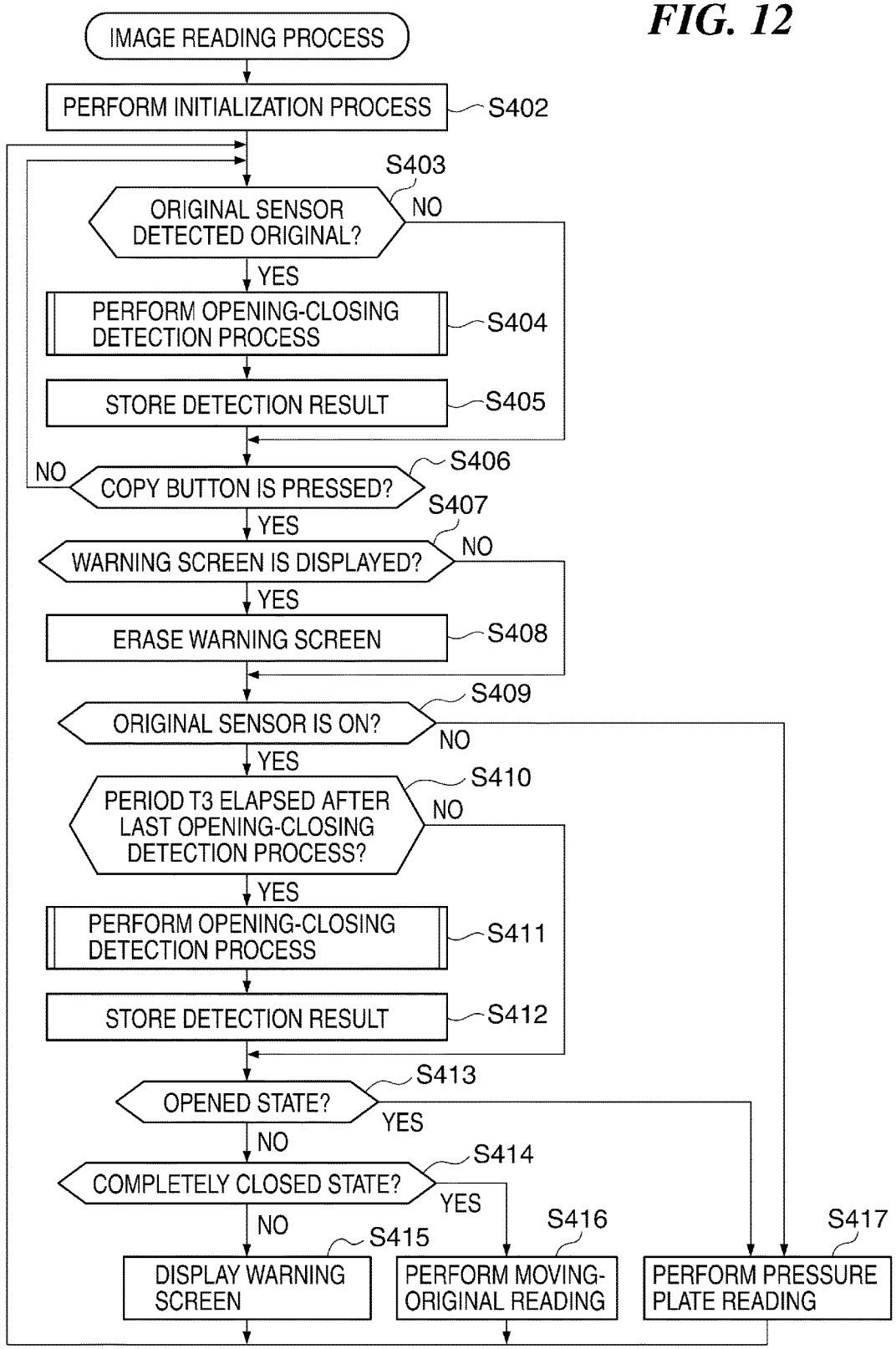
FIG. 12 is a flowchart showing procedures of an image reading process according to a second embodiment.

FIG. 12 is a flowchart showing procedures of an image reading process according to the second embodiment. The reader CPU 301 of the reader controller 300 performs this image reading process according to an image reading program stored in the ROM-A 302.

As shown in FIG. 12, when the power is applied to the image reading apparatus and the image reading process is started, the reader CPU 301 performs the initialization process of the image reading apparatus (step S402) in the same manner as the first embodiment.

After the initialization processing is completed, the reader CPU 301 determines whether any original is being set on the original tray 201 of the ADF 200 (i.e., whether the original sensor 206 detected an original) in step S403. As a result of the determination in the step S403, when the original sensor 206 detected an original ("YES" in the step S403), the reader CPU 301 performs the opening-closing detection process for the ADF (step S404). The opening-closing detection process will be later described in detail using a drawing.

After the opening-closing detection process for the ADF is completed, the reader CPU 301 stores a detection result into the RAM-A 303 (step S405). Next, the reader CPU 301 determines whether a user pressed the copy button (step S406). As a result of the determination in the step S406, when the user pressed the copy button ("YES" in the step S406), the reader CPU 301 determines whether the warning screen, which warns that the ADF is in the floated state, is being displayed on the operation-display unit 316 (step S407). As a result of the determination in the step S407, when the warning screen is being displayed ("YES" in the step S407), the reader CPU 301 erases the warning screen (step S408), and proceeds with the process to step S409.

Next, the reader CPU 301 determines whether the original sensor 206 is ON (step S409). As a result of this, the reader CPU 301 determines whether any original is being placed on the original tray 201. As a result of the determination in the step S409, when any original is being placed on the original tray 201 ("YES" in the step S409), the reader CPU 301 proceeds with the process to step S410.

In the step S410, the reader CPU 301 determines whether the opening-closing detection process was not performed before pressing the copy button or whether a predetermined period T3 elapsed after performing the opening-closing detection process. As a result of the determination in the step S410, when the opening-closing detection process was not performed or the predetermined period T3 elapsed after performing the process ("YES" in the step S410), the reader CPU 301 performs the opening-closing detection process for the ADF (step S411). The concrete content of the opening-closing detection process will be described below. Next, the reader CPU 301 stores the detection result of the opening-closing detection process into the RAM-A 303 (step S212).

Figure 6:
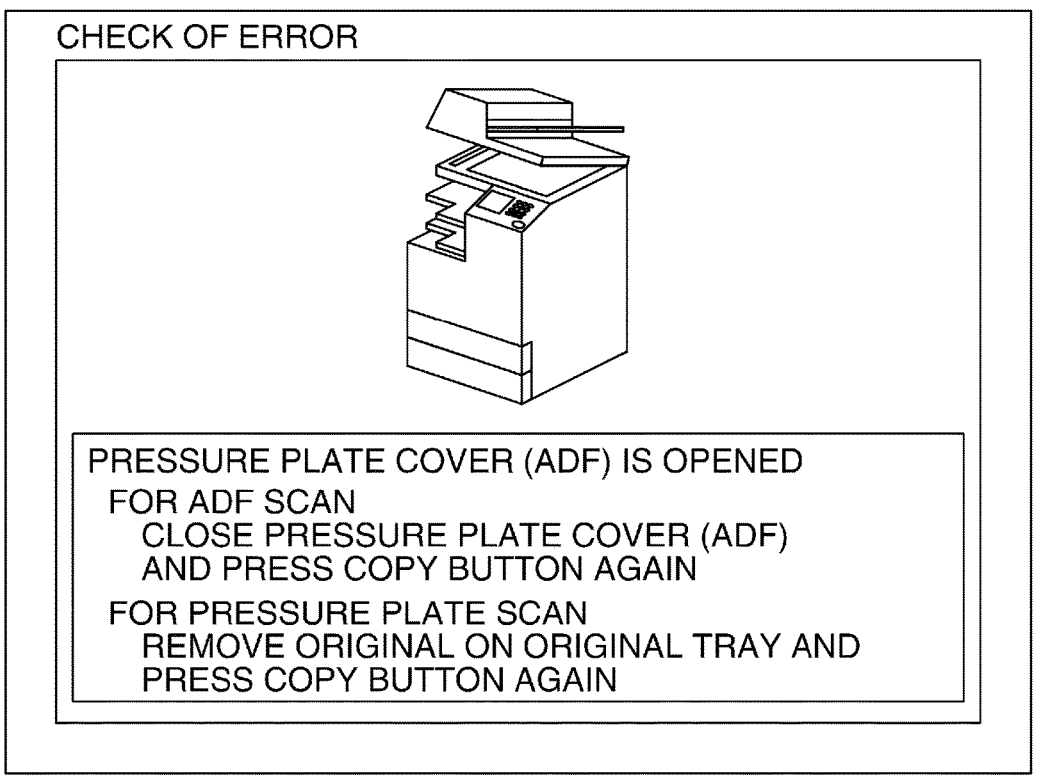
FIG. 6 is a view showing a warning screen displayed on an operation-display unit.

Next, the reader CPU 301 determines whether the ADF 200 is in the opened state on the basis of the latest detection result of the opening-closing detection process (step S413). As a result of the determination in the step S413, when the ADF 200 is not in the opened state ("NO" in the step S413), the reader CPU 301 determines whether the ADF 200 is in the completely closed state (step S414). As a result of the determination in the step S414, when the ADF 200 is not in the completely closed state ("NO" in the step S414), the reader CPU 301 displays the warning screen as shown in FIG. 6 on the operation-display unit 316 (step S215) in the same manner as the first embodiment. That is, when determining that the ADF is not in the opened state in the determination in the step S413 and that the ADF is not in the completely closed state in the determination in the step S414, the reader CPU 301 determines that the ADF is in the floated state, and displays the warning screen that warns the floated state of the ADF 200. As a result of this, the reader CPU 301 urges the user to cancel the floated state of the ADF and to reinput a control instruction.

On the other hand, as a result of the determination in the step S413, when the ADF 200 is in the opened state ("YES" in the step S413) or as a result of the determination in the step S409, the original sensor 206 is OFF ("NO" in the step S409), the reader CPU 301 shift to the pressure plate reading mode, and performs the pressure plate reading (S417). As a result of the determination in the step S414, when the ADF 200 is in the completely closed state ("YES" in the step S414), the reader CPU 301 reads the moving original using the ADF 200 (step S416).

Moreover, as a result of the determination in the step S403, when the original sensor 206 does not detect an original ("NO" in the step S403), the reader CPU 301 proceeds with the process to the step S406. That is, the reader CPU 301 repeats the process in the steps S403 through S405 until the copy button is pressed without performing the opening-closing detection process.

Moreover, as a result of the determination in the step S407, when the warning screen is not displayed ("NO" in the step S407), the reader CPU 301 proceeds with the process to the step S409. Moreover, as a result of the determination in the step S410, when the opening-closing detection process was performed before the copy button was pressed and the predetermined period T3 does not elapse after the opening-closing detection process was performed ("NO" in the step S410), the reader CPU 301 proceeds with the process to the step S413. In this case, the opening-closing detection process is not performed.

According to the process in FIG. 12, when an original is placed on the original tray 201 ("YES" in the step S409), the opening-closing detection process for the ADF 200 is performed (step S411). This enables the suitable reading operation corresponding to the opening/closing state of the ADF. That is, the pressure plate reading is performed (step S417) when the ADF is in the opened state, the moving original is read using the ADF (step S416) when the ADF is in the completely closed state, and the warning screen is displayed (step S415) when the ADF is in the floated state.

Figure 13:
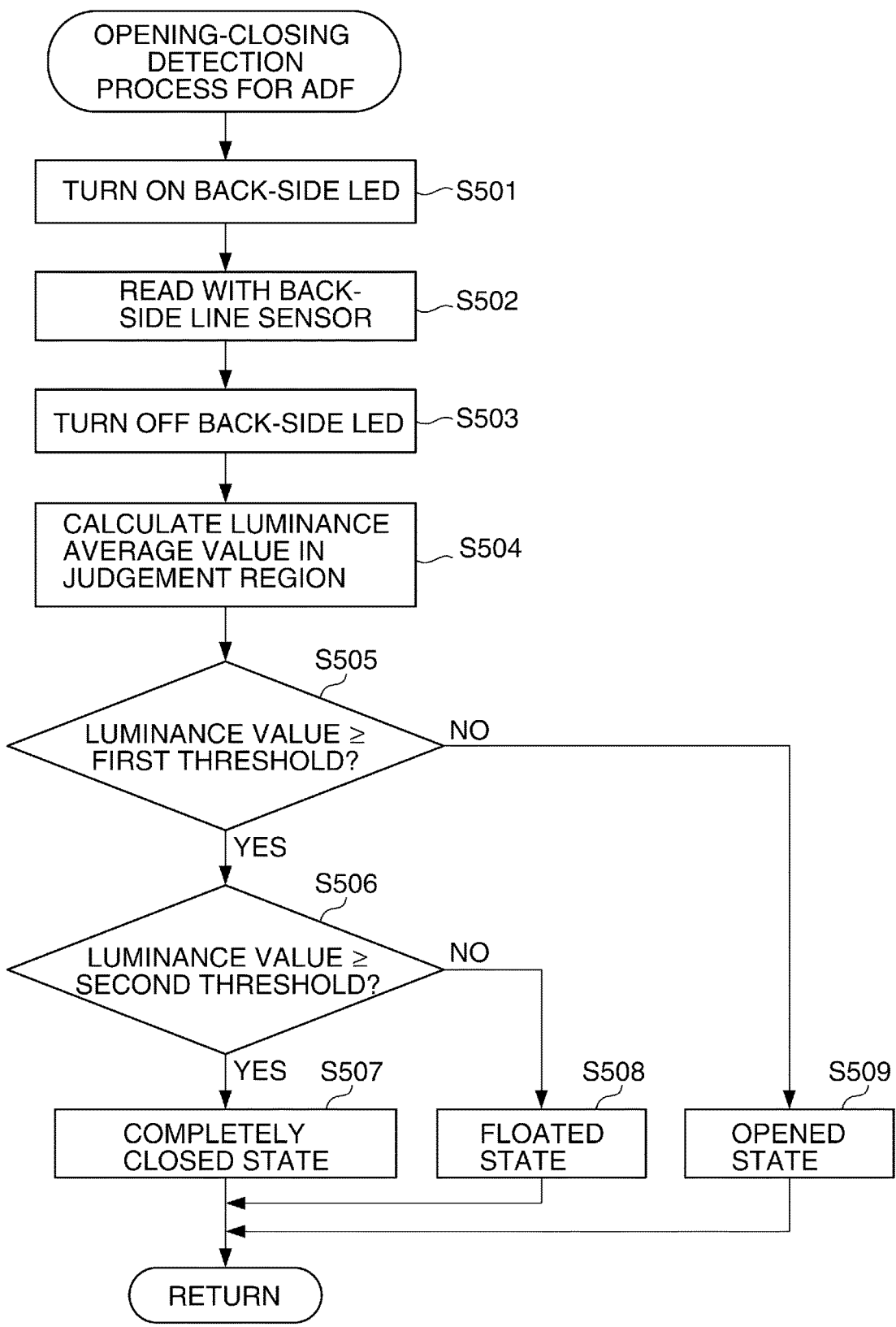
FIG. 13 is a flowchart showing procedures of an opening-closing detection process for the ADF performed in the step S404 or S411 in FIG. 12.

FIG. 13 is a flowchart showing procedures of the opening-closing detection process for the ADF performed in the step S404 or S411 in FIG. 12.

The reader CPU 301 of the reader controller 300 in the image reading apparatus 500 performs the opening-closing detection process for the ADF according to an opening-closing detection program for the ADF stored in the ROM-A 302.

A process in steps S501 through S503 in FIG. 13 is the same as that in the steps S301 through S303 in FIG. 9. Accordingly, the description is omitted.

After turning OFF the back-side LEDs 213 and 214 (step S503), the reader CPU 301 calculates a luminance average value (hereinafter referred to as a "luminance value", simply) of the reflected light from the back-side counter member 103 in a plurality of pixels included in a judgment region A set in the back-side line sensor 216 (step S504).

Figure 14:
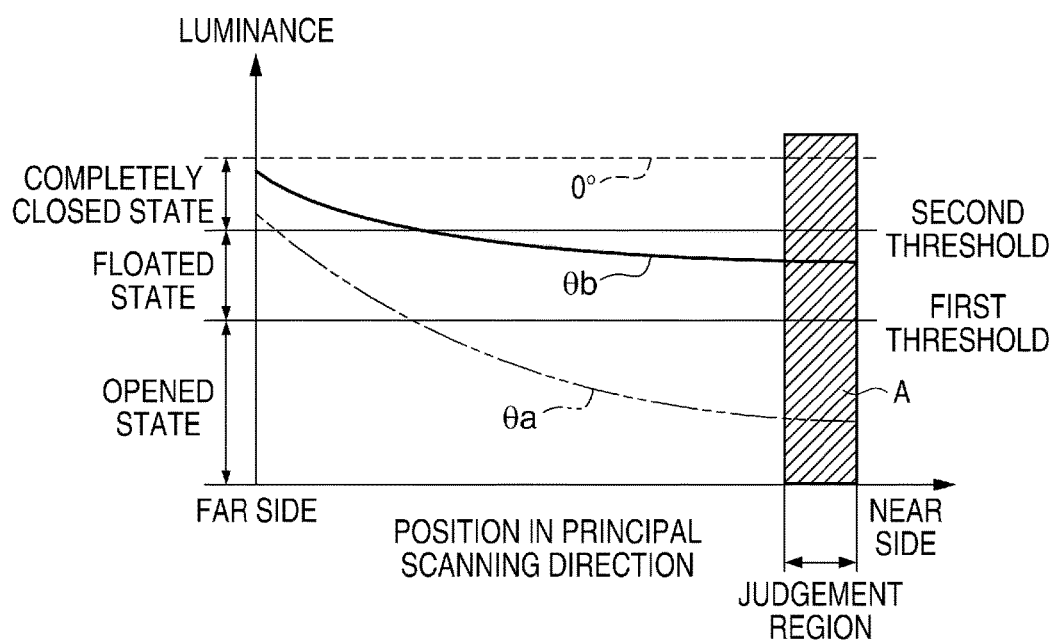
FIG. 14 is a graph showing a relationship between a luminance of reflected light from a back-side counter member that is detected at each position of a back-side line sensor in the second embodiment in the principal scanning direction and the opening/closing state of the ADF.

FIG. 14 is a graph showing a relationship between a luminance of reflected light from the back-side counter member 103 that is detected at each position of the back-side line sensor in the second embodiment in the principal scanning direction and the opening/closing state of the ADF.

As shown in FIG. 14, the judgment region A is set as the pixel group at the near side of the back-side line sensor 216 in the same manner as the first embodiment.

In the second embodiment that is not provided with the opening-closing detector 111, the opened state, completely closed state, and floated state of the ADF 200 is detected using first and second thresholds. The first threshold corresponds to the detection angle $\theta\alpha$ of the opening-closing detector 111 in the first embodiment. When the luminance value in the judgment region A is smaller than the first threshold, the ADF 200 is determined as the opened state. On the other hand, when the luminance value in the judgment region A is equal to or more than the first threshold and is smaller than the second threshold, the ADF 200 is determined as the floated state. When the luminance value in the judgment region A is more than the second threshold, the ADF 200 is determined as the completely closed state. As a result of this, three opening/closing states of the ADF 200 are detectable with the configuration that is not provided with the opening-closing detector 111.

Referring back to FIG. 13, after calculating the luminance value in the judgment region A (step S504), the reader CPU 301 determines whether the calculated luminance value is equal to or more than the first threshold (step S505). As a result of the determination in the step S505, when the luminance value is equal to or more than the first threshold ("YES" in the step S505), the reader CPU 301 determines that the ADF 200 is not in the opened state, and determines whether the luminance value is equal to or more than the second threshold (step S506). As a result of the determination in the step S506, when the luminance value is equal to or more than the second threshold ("YES" in the step S506), the reader CPU 301 determines that the ADF 200 is in the completely closed state (step S507), and finishes this process.

On the other hand, as a result of the determination in the step S505, when the luminance value is less than the first threshold ("NO" in the step S505), the reader CPU 301 determines that the ADF 200 is in the opened state (step S509), and finishes this process. Moreover, as a result of the determination in the step S506, when the luminance value is less than the second threshold ("NO" in the step S506), the reader CPU 301 determines that the ADF 200 is in the floated state (step S508), and finishes this process.

According to the process in FIG. 13, even if the opening-closing detector 111 is not disposed, the opened state, completely closed state, and floated state of the ADF 200 are determined by comparing the luminance value of the reflected light from the judgment region A with the first and second thresholds.

Moreover, according to the second embodiment, the period needed to move the reader is reduced as compared with the conventional technique that detects the opening/closing state using the front-side reader 104 that is movable along the platen glass 101. As a result of this, the opening/closing state of the ADF 200 that is pivotally attached to the reading apparatus body 100 is detected correctly without increasing FCOT, and occurrence of jam is prevented as with the above-mentioned first embodiment.

According to the second embodiment, the opening-closing detection process for the ADF 200 is performed in advance at the timing when the original sensor 206 detects an original placed on the original tray 201. Accordingly, occurrence of jam due to the floated state of the ADF is avoided without increasing FCOT.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-177543, filed Sep. 9, 2015, which is hereby incorporated by reference herein in its entirety.

What is claimed is:

1. An image reading apparatus comprising:
  a first unit comprising:
    a platen on which an original is placed;
    a member; and
    a first reader, with a read position thereof being movable in a predetermined direction, that reads a first side of an original; and
  a second unit that is pivotable against said first unit and comprising:
    an original tray on which an original is stacked;
    a conveyance unit configured to convey an original stacked on said original tray along a conveyance path; and
    a second reader that reads a second face that differs from the first side of the original conveyed by said conveyance unit; and
  a controller configured to determine an opening/closing state of said second unit against said first unit based on read data obtained when said second reader reads said member disposed in said first unit,
  wherein said first reader reads the first side of the original conveyed by said conveyance unit at a first read position and said second reader reads the second side of the original conveyed by said conveyance unit at a second read position that differs from the first read position in a case where the original placed on said original tray is read, and said first reader reads the first side of the original while moving under the original in the predetermined direction in a case where the original placed on said platen is read.

2. The image reading apparatus according to claim 1, wherein said second reader is fixed in said second unit.

3. The image reading apparatus according to claim 1, wherein said controller determines that said second unit is in:
  an opened state against said first unit when a value of the read data is smaller than a first threshold;
  a floated state against said first unit when the value of the read data is equal to or more than the first threshold and is smaller than a second threshold; and
  a completely closed state against said first unit when the value of the read data is more than the second threshold.

4. The image reading apparatus according to claim 3, wherein the floated state has a gap between said platen and said second unit due to the original being thicker than a predetermined thickness being placed on said platen of said first unit.

5. The image reading apparatus according to claim 3, wherein said controller allows reading a moving original conveyed from said original tray when said second unit is determined in the completely closed state against said first unit.

6. The image reading apparatus according to claim 1, further comprising:
  an opening-closing detector configured to detect whether said second unit is in an opened state against said first unit,
  wherein said controller determines the opening/closing state of said second unit against said first unit based on the read data after said opening-closing detector detects that said second unit is not in the opened state against said first unit.

7. The image reading apparatus according to claim 6, wherein said controller determines that said second unit is in:
  a completely closed state against said first unit when a value of the read data is equal to or more than a third threshold; and
  a floated state against said first unit when the value of the read data is less than the third threshold.

8. The image reading apparatus according to claim 7, wherein said controller allows reading a moving original conveyed from said original tray when said second unit is determined in the completely closed state against said first unit.

9. The image reading apparatus according to claim 1, further comprising:
  an original sensor that detects whether an original is placed on said original tray,
  wherein said controller determines the opening/closing state of said second unit against said first unit based on the read data after said original sensor detects that the original is placed on said original tray.

10. The image reading apparatus according to claim 1, wherein said controller determines the opening/closing state of the said second unit against said first unit based on the read data before starting an original-reading process that reads the original by at least one of said first reader and said second reader.

11. The image reading apparatus according to claim 1, wherein said controller determines the opening/closing state of the said second unit against said first unit based on a value of the read data detected from a predetermined region in said second reader that is farthest from a pivot between said first unit and said second unit.

12. An image forming apparatus comprising:
  a first unit comprising:
    a platen on which an original is placed;
    a member; and
    a first reader, with a read position thereof being movable in a predetermined direction, that reads a first side of an original; and
  a second unit that is pivotable against said first unit, and comprising:
    an original tray on which an original is stacked;
    a conveyance unit configured to convey an original stacked on said original tray along a conveyance path; and
    a second reader that reads a second face that differs from the first side of the original conveyed by said conveyance unit;
  a controller configured to determine an opening/closing state of said second unit against said first unit based on read data obtained when said second reader reads said member disposed in said first unit; and
  an image forming unit configured to form an image on a recording sheet using image data of an original read by said first reader and said second reader,
  wherein said first reader reads the first side of the original conveyed by said conveyance unit at a first read position and said second reader reads the second side of the original conveyed by said conveyance unit at a second read position that differs from the first read position in a case where the original placed on said original tray is read, and said first reader reads the first side of the original while moving under the original in the predetermined direction in a case where the original placed on said platen is read.

\* \* \* \* \*